(12) United States Patent
Span et al.

(10) Patent No.: US 10,689,023 B2
(45) Date of Patent: Jun. 23, 2020

(54) RACK-AND-PINION STEERING SYSTEM FOR MOTOR VEHICLES

(71) Applicant: TRW Automotive GmbH, Alfdorf (DE)

(72) Inventors: Eduard Span, Köln (DE); Robert Kolloch, Mönchengladbach (DE); Nadja Nilgen, Düsseldorf (DE); Rolf von Laar, Niederkrüchten (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 518 days.

(21) Appl. No.: 15/510,244

(22) PCT Filed: Jul. 15, 2015

(86) PCT No.: PCT/EP2015/066109
§ 371 (c)(1),
(2) Date: Mar. 10, 2017

(87) PCT Pub. No.: WO2016/045811
PCT Pub. Date: Mar. 31, 2016

(65) Prior Publication Data
US 2017/0297608 A1    Oct. 19, 2017

(30) Foreign Application Priority Data

Sep. 22, 2014 (DE) .................. 10 2014 113 666

(51) Int. Cl.
*B62D 3/00* (2006.01)
*B62D 3/12* (2006.01)
*F16H 19/04* (2006.01)

(52) U.S. Cl.
CPC .............. *B62D 3/126* (2013.01); *B62D 3/12* (2013.01); *F16H 19/04* (2013.01); *F16H 2019/046* (2013.01)

(58) Field of Classification Search
CPC ........ B62D 5/0469; B62D 3/126; B62D 3/12; F16H 19/04; F16H 2019/046
(Continued)

(56) References Cited

U.S. PATENT DOCUMENTS 4,218,933 A * 8/1980 Allen ................. B62D 3/12
74/422
5,694,810 A * 12/1997 Iwasa ................. B62D 5/12
74/422
(Continued)

FOREIGN PATENT DOCUMENTS

CN          102369131 A      3/2012
CN          102458960 A      5/2012
(Continued)

OTHER PUBLICATIONS

PCT International Search Report and Written Report, Application No. PCT/EP2015/066109, dated Sep. 17, 2015.
(Continued)

*Primary Examiner* — Victor L MacArthur
(74) *Attorney, Agent, or Firm* — MacMillan, Sobanski & Todd, LLC

(57) ABSTRACT

A rack-and-pinion steering for a motor vehicle, having a rack which has a longitudinal axis, a rack housing in which the rack is guided for axial displacement, and at least one end stop damping assembly for the rack, the end stop damping assembly being received in the rack housing, the end stop damping assembly including a compression body for damping an end stop and a stop member which is mounted to the rack housing for limited displacement in the axial direction, the stop member resting against a first supporting surface of the rack housing at least partly by means of the compression body in a first axial direction and
(Continued)

resting against a second supporting surface of the rack housing in an opposite, second axial direction.

15 Claims, 4 Drawing Sheets

(58) Field of Classification Search
USPC .................. 74/29, 89.11, 422; 280/93.514
See application file for complete search history.

(56) References Cited

U.S. PATENT DOCUMENTS

| | | | | |
|---|---|---|---|---|
| 5,788,009 | A | 8/1998 | Lee | |
| 6,422,779 | B1* | 7/2002 | Spagnuolo | B62D 3/12 |
| | | | | 280/93.511 |
| 7,275,618 | B2* | 10/2007 | Abe | B62D 3/12 |
| | | | | 180/443 |
| 9,156,493 | B1* | 10/2015 | Kimijima | B62D 3/12 |
| 9,573,615 | B2 | 2/2017 | Schaumann | |
| 2006/0131828 | A1* | 6/2006 | Tanaka | B62D 3/12 |
| | | | | 280/93.514 |
| 2012/0007326 | A1 | 1/2012 | Hein et al. | |
| 2012/0111132 | A1* | 5/2012 | Schaumann | B62D 3/12 |
| | | | | 74/29 |
| 2014/0137692 | A1* | 5/2014 | Ohashi | B62D 3/12 |
| | | | | 74/492 |
| 2015/0151787 | A1* | 6/2015 | Ohashi | B62D 7/163 |
| | | | | 280/93.511 |
| 2015/0274192 | A1* | 10/2015 | Enomoto | B62D 3/126 |
| | | | | 280/93.51 |
| 2017/0267277 | A1* | 9/2017 | Ohashi | B62D 3/123 |

FOREIGN PATENT DOCUMENTS

| | | |
|---|---|---|
| DE | 102005050798 A1 | 4/2007 |
| DE | 102007000680 A1 | 5/2009 |
| DE | 102009019890 A1 | 11/2010 |
| DE | 102012101147 A1 | 8/2013 |
| FR | 2966414 A1 | 4/2012 |
| JP | 2006123643 A | 5/2006 |
| WO | 2010108891 A1 | 9/2010 |
| WO | 2012055540 A1 | 5/2012 |

OTHER PUBLICATIONS

German Search Report, Application No. DE102014113666.7 dated Jul. 1, 2015.
PCT International Preliminary Report on Patentability, Application No. PCT/EP2015/066109 filed Jul. 15, 2015, dated Mar. 28, 2017.

* cited by examiner

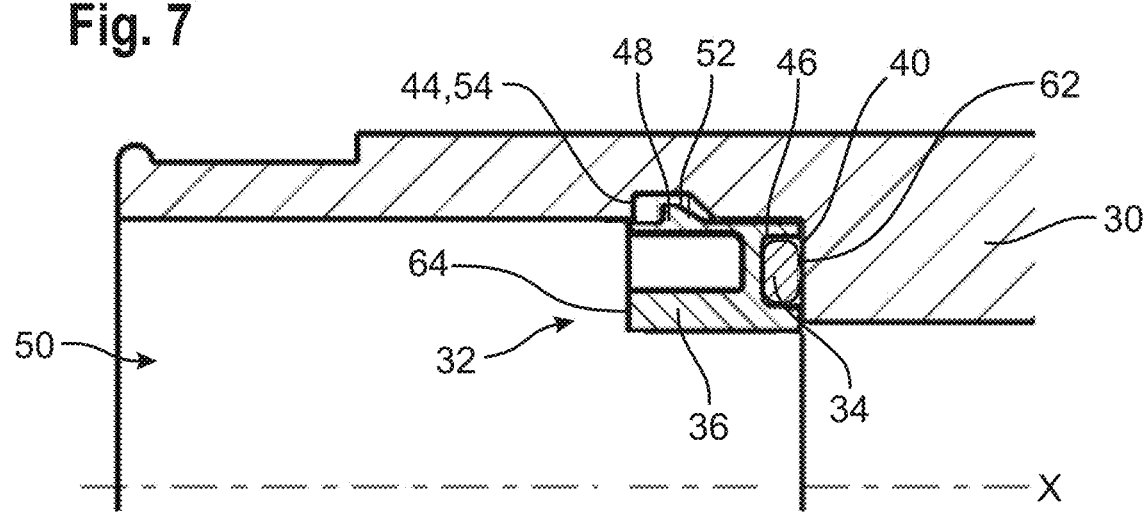

RACK-AND-PINION STEERING SYSTEM FOR MOTOR VEHICLES

CROSS-REFERENCE TO RELATED APPLICATIONS

This application is a national stage of International Application No. PCT/EP2015/066109 filed 15 Jul. 2015, the disclosures of which are incorporated herein by reference in entirety, and which claimed priority to German Patent Application No. 10 2014 113 666.7 filed 22 Sep. 2014, the disclosures of which are incorporated herein by reference in entirety.

BACKGROUND OF THE INVENTION

The invention relates to a rack-and-pinion steering for a motor vehicle, including a rack which has a longitudinal axis, a rack housing in which the rack is guided for axial displacement, and at least one end stop damping assembly for the rack, the end stop damping assembly being received in the rack housing, the end stop damping assembly including a compression body for damping an end stop and a stop member which is mounted to the rack housing for limited displacement in the axial direction, the stop member resting against a first supporting surface of the rack housing at least partly by means of the compression body in a first axial direction.

Such a rack-and-pinion steering is known from the generic document DE 10 2009 019 890 A1, for example. The end stop damping assembly here includes at least one stop ring and at least one elastic compression body and can be mounted in the rack housing of the rack-and-pinion steering with little effort.

BRIEF SUMMARY OF THE INVENTION

A feature of the invention is to provide a rack-and-pinion steering having an end stop damping assembly which has a particularly simple structure by design and is subjected to particularly low wear in operation of the rack-and-pinion steering.

According to the invention, this feature is achieved by a rack-and-pinion steering of the type initially mentioned, in which the stop member rests against a second supporting surface of the rack housing in an opposite, second axial direction. By being mounted for limited displacement in the axial direction between two opposite supporting surfaces of the rack housing, the stop member defines a maximum damping travel of the end stop damping assembly and, in addition, ensures that the end stop damping assembly is reliably fastened within the rack housing. In this way, the stop member provides for a particularly simple design of the end stop damping assembly, involving few component parts.

Preferably, the stop member is a contact ring which, in an axial end stop position of the rack-and-pinion steering, comes into contact on its front face with the rack or with a part that is firmly connected with the rack. As a result, a fastening function for the end stop damping assembly and a stop function for the rack are combined in an advantageous manner in one single component.

In one embodiment of the rack-and-pinion steering, the stop member includes detent elements and produces a detent connection with the rack housing. This provides for a simple and reliable mounting of the end stop damping assembly to or in the rack housing.

In this embodiment, the rack housing preferably has a cylindrical opening for receiving the rack, the opening having at least one radial recess formed therein into which the detent elements of the stop member extend. Such a radial recess in the cylindrical opening of the rack housing can be realized with little effort in terms of production engineering, so that the fastening of the end stop damping assembly can be realized with little effort on the housing side as well.

In this case, it is particularly preferred if the radial recess in the cylindrical opening of the rack housing is formed as a circular groove, a groove flank of this groove constituting the second supporting surface. A circular groove can be produced in the cylindrical opening with little effort in terms of production engineering and allows a reliable axial fastening of the stop member and thus of the end stop damping assembly.

In a further embodiment of the rack-and-pinion steering, an axial displacement of the stop member in the mounted condition is limited by the first supporting surface and the second supporting surface of the rack housing, the stop member resting against the first supporting surface in its first axial end position and against the second supporting surface in its opposite, second axial end position.

Preferably, at least one of the first axial supporting surface and the second axial supporting surface extends substantially perpendicularly to the longitudinal axis of the rack. Supporting surfaces that extend perpendicularly to the longitudinal axis ensure a reliable axial fastening of the stop member or the end stop damping assembly and do not generate any undesirable stress on the stop member in the radial direction when acted upon in the axial direction by the stop member.

The stop member mounted in the rack housing is preferably axially pretensioned against the second supporting surface by the compression body. This pretension, for one thing, ensures a defined axial position of the stop member and, for another thing, prevents any undesirable rattling noises which might be generated by an axial clearance of the stop member between the supporting surfaces in the case of vibrations of the vehicle or of the steering.

Preferably, the compression body is received in an axial depression in the front face of the stop member and projects axially beyond the stop member. In particular, the axial depression may be a circular groove and the compression body may be compression ring that is received in this groove. The compression body is well protected in the axial depression and can be positioned at the stop member in a simple manner.

Preferably, the stop member is configured as an auxiliary support and limits a bending of the rack. This allows the stop member to constitute a temporary, lateral rack bearing in the case of an extreme bending stress and a deformation of the rack resulting therefrom, the rack bearing limiting a deformation of the rack and in this way preventing possible damage to the rack-and-pinion-steering.

In a further embodiment of the rack-and-pinion steering, the stop member is fixed within the rack housing substantially non-rotationally in relation to the longitudinal axis. In rack-and-pinion steering systems, a steering torque applied by the driver is transmitted to steerable wheels of the motor vehicle via a pinion and a rack toothing that is in engagement with the pinion, the toothing of the rack more particularly being a helical toothing. It has been found that the end stop damping assembly experiences a considerable torsional load applied by the rack in the end stop of the rack-and-pinion steering. This torsional load is due to the fact that the rack is twisted about its longitudinal axis when the force is transmitted from the pinion to the rack toothing. When the rack-and-pinion steering has reached the end stop and the driver continues to apply a steering torque towards the end stop, the contact force between the pinion and the rack toothing increases so strongly that a torsion of up to about 5° and torsional moments of about 30 to 40 Nm can occur in the end stop damping assembly. This torsional stress in the end stop of the rack-and-pinion steering would decisively contribute to the wear of the compression body and reduce the useful life thereof considerably. However, owing to the stop member being mounted such that rotation is prevented in the circumferential direction within the rack housing, it is at best the comparatively robust stop member that experiences a torsional stress, rather than the compression body, which is less robust, so that the service life and, thus, the intervals for an exchange of the end stop damping assembly are prolonged.

Preferably, the stop member is a plastic ring, in particular from polyamide. Plastic rings are simple and inexpensive to manufacture and, when the material thereof is suitably selected, they are sufficiently robust to be able to reliably and permanently take up and transfer the torsional loads and axial impact loads that occur.

In a further embodiment of the rack-and-pinion steering, the compression body and the stop member are formed to be ring-shaped and are arranged concentrically with the longitudinal axis.

In particular, in this case an inside diameter of the ring-shaped stop member may be smaller than an inside diameter of the ring-shaped compression body. In this way, it is ensured with little effort that in the case of an extreme bending stress on the rack, the stop member constitutes an auxiliary support for the rack, whereas the compression body, due to its larger inside diameter, does not come into contact with the rack. This reliably prevents an undesirable wear of the compression body. The additional support surface which the stop member defines for the rack in this case prevents an excessive bending stress on the rack and a resultant damage to or impairment of the function of the rack-and-pinion steering.

The compression body is preferably made from an elastomer, in particular from rubber or polyurethane. Compression bodies of this type are simple and inexpensive to manufacture and, in addition, permanently exhibit good and substantially constant damping characteristics.

In a further embodiment of the rack-and-pinion steering, the compression body is connected with the stop member by at least one of a frictional connection, an adhesive bond and a detent connection. These variant forms of connections, separately or in combination, constitute simple and inexpensive options for captively fixing the compression body to the stop member.

Other advantages of this invention will become apparent to those skilled in the art from the following detailed description of the preferred embodiments, when read in light of the accompanying drawings.

BRIEF DESCRIPTION OF THE DRAWINGS

FIG. 7 shows the stop member resting against the first supporting surface.

DETAILED DESCRIPTION OF THE INVENTION

Figure 1:
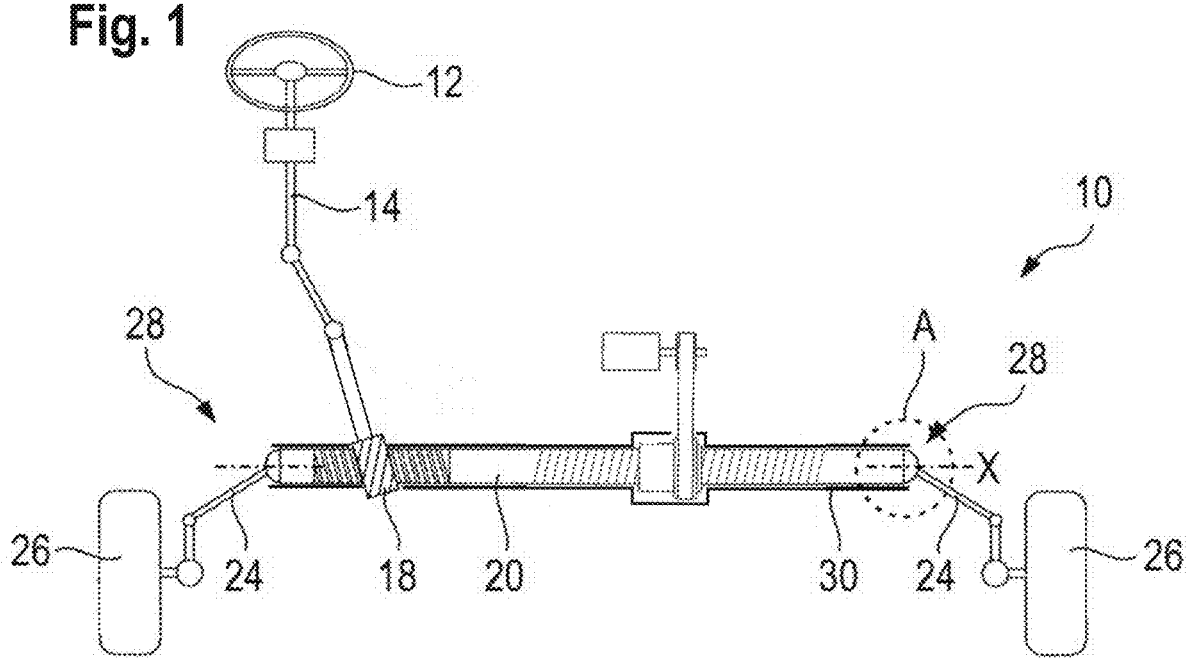
FIG. 1 shows a schematic sketch of a rack-and-pinion steering according to the invention.

FIG. 1 shows a rack-and-pinion steering 10 for motor vehicles. In the illustrated exemplary embodiment, the rack-and-pinion steering 10 is part of an electrohydraulic vehicle steering system in which a steering wheel 12 is connected to a pinion 18 via a steering column 14. The pinion 18 meshes with a rack 20, so that the latter is acted upon by a manual steering force applied to the steering wheel 12.

Further provided is an electric motor 16 which is adapted to apply an electric steering assist force to the rack 20 in a known manner by means of a ball screw 21. Here, the steering assist force is introduced into a threaded section 25 of the rack 20 by the electric motor 16 via a belt 22 and a recirculating ball nut 23, the recirculating ball nut 23 being supported at a rack housing 30 of the rack-and-pinion steering 10 by means of a four-point bearing.

Alternatively, the steering assist force may also be applied in different ways, for example by means of a hydraulic actuating cylinder.

The rack 20 is coupled at its axial ends to steerable wheels 26 of a motor vehicle by means of tie rods 24, the rack 20 being connected to the tie rods 24 by a respective ball joint 28. An end stop for the rack 20 is formed on a rack housing 30 in a connecting area "A" between the rack 20 and the tie rod 24, a maximum steering lock being defined by the end stop. In a steering movement up to the end stop, high mechanical stresses occur in the rack-and-pinion steering 10. To avoid damage to the steering, a damping is therefore usually provided in the region of the end stop.

Figure 2:
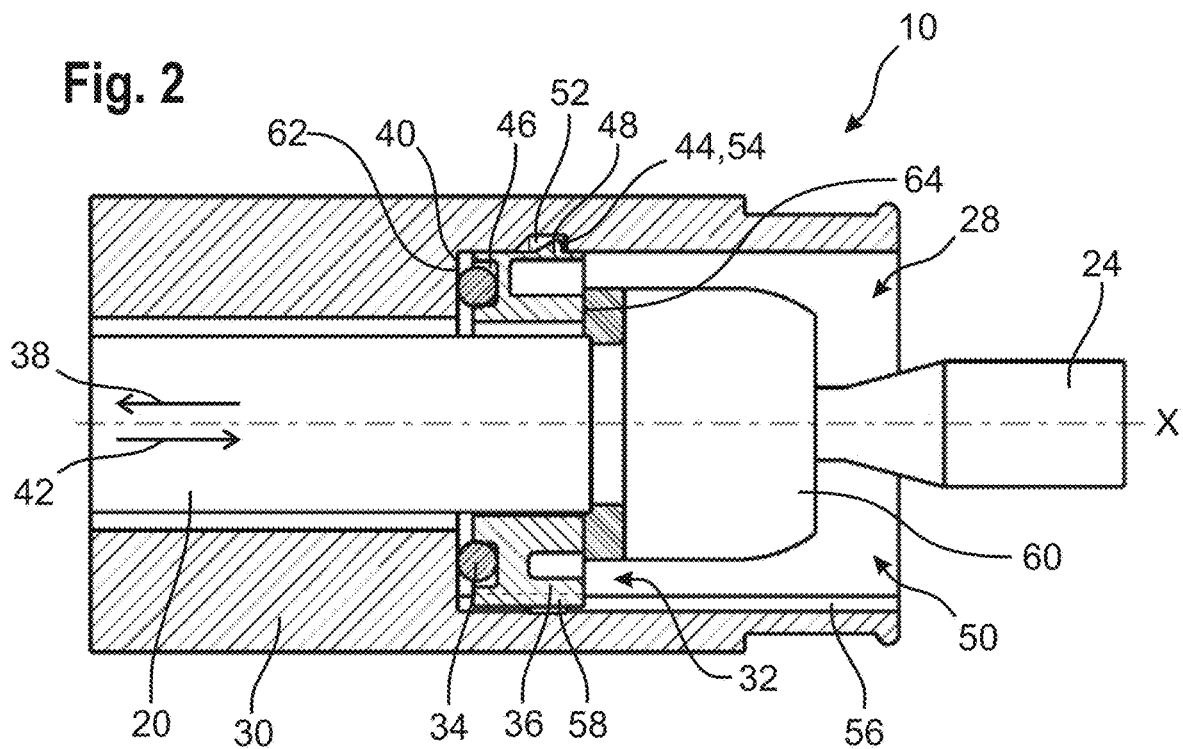
FIG. 2 shows an area "A" of the rack-and-pinion steering according to FIG. 1 in a detail section.

A particularly advantageous end stop damping assembly 32 is illustrated in FIG. 2, which shows the area "A" from FIG. 1 in section.

According to FIG. 2, the rack-and-pinion steering 10 comprises the rack 20, which has a longitudinal axis X, the rack housing 30, in which the rack 20 is guided for axial displacement between two end stops, and at least one end stop damping assembly 32 for the rack 20, the end stop damping assembly 32 being received in the rack housing 30 and mounted to the rack housing 30 in the axial direction.

The end stop damping assembly 32 here includes a compression body 34 for damping an end stop 62 and a stop member 36 which is mounted to the rack housing 30 for limited displacement in the axial direction for fastening the end stop damping assembly 32 in the rack housing 30. Here, the stop member 36 rests against a first supporting surface 40 of the rack housing 30 at least partly by means of the compression body 34 in a first axial direction 38 and rests against a second supporting surface 44 of the rack housing 30 in an opposite, second axial direction 42.

Figure 3:
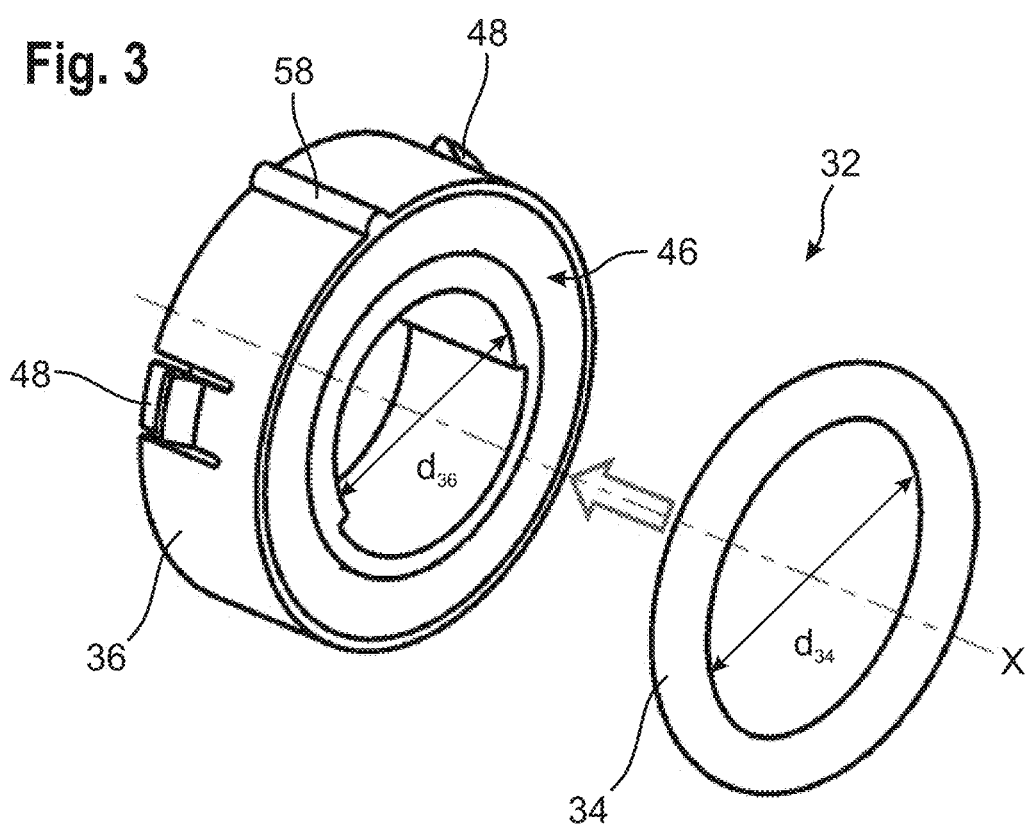
FIG. 3 shows a perspective exploded view of an end stop damping assembly for the rack-and-pinion steering according to FIG. 2.

FIG. 3 shows the end stop damping assembly 32 of the rack-and-pinion steering 10 in a perspective exploded view, clearly showing that the compression body 34 and the stop member 36 are formed to be ring-shaped and are arranged concentrically with the longitudinal axis X.

Figure 5:
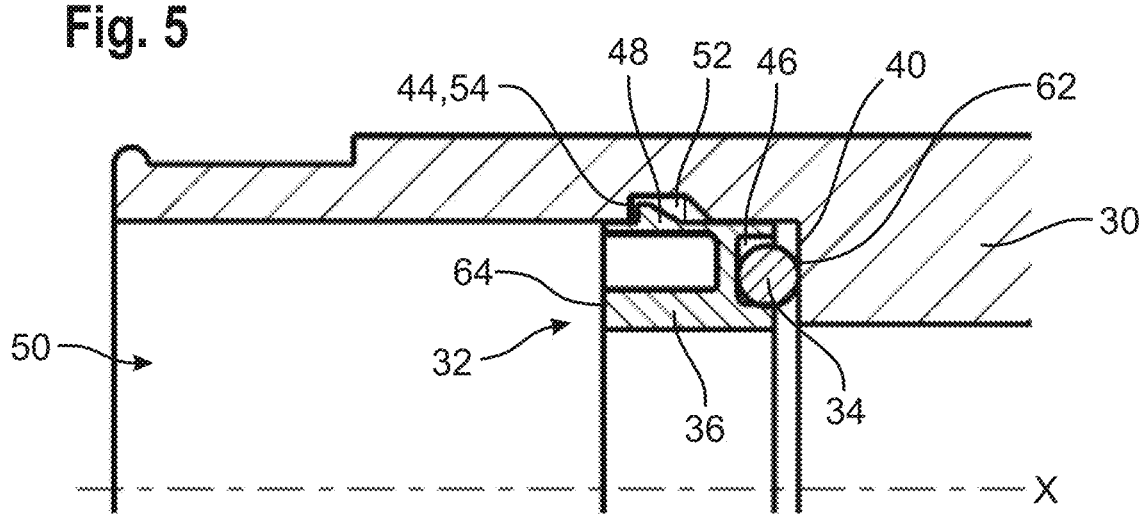
FIG. 5 shows a sectional detail of the end stop damping assembly of FIG. 4 in the mounted condition.
Figure 6:
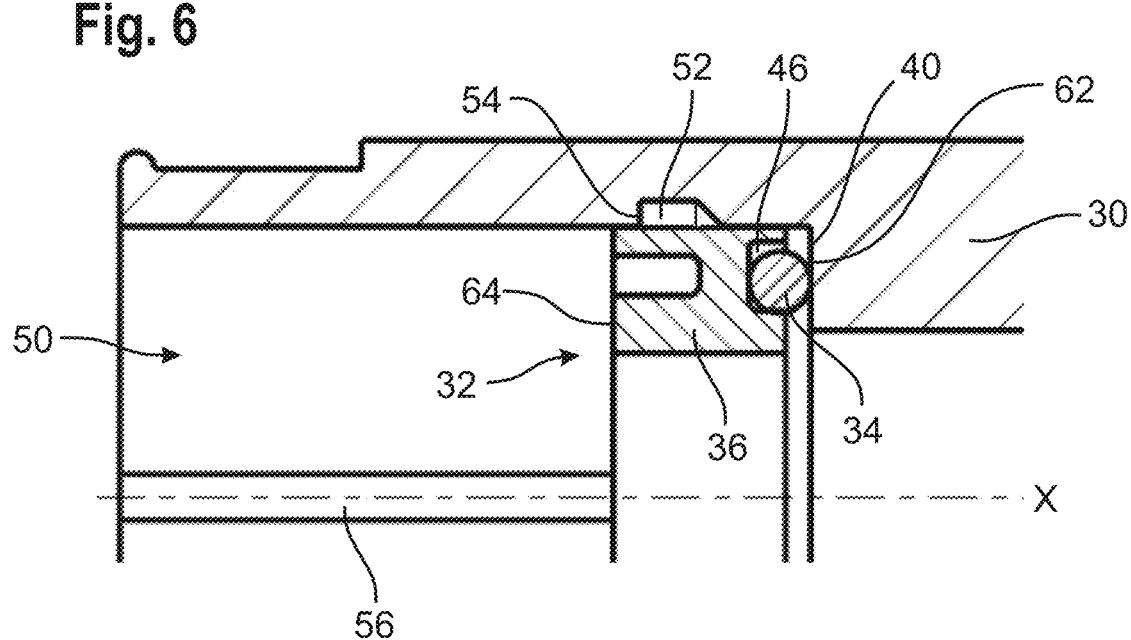
FIG. 6 shows a further sectional detail of the end stop damping assembly of FIG. 4 in the mounted condition.

In the assembled condition of the end stop damping assembly 32, the compression body 34, which is in the form of a compression ring, is received in an axial depression 46 in the form of a circular groove in the front face 64 of the stop member 36 and projects axially beyond the stop member 36, as can be seen in FIGS. 2, 5 and 6.

Accordingly, an inside diameter $d_{36}$ of the ring-shaped stop member 36 is smaller than an inside diameter $d_{34}$ of the ring-shaped compression body 34. The compression body 34 is therefore protected from a contact with the rack 20 and an attendant, undesirable wear. The stop member 36, on the other hand, has the smallest radial distance from the rack 20 and, more particularly, is configured as an auxiliary support which limits a bending of the rack 20. It should be appreciated that when the rack 20 is in the non-loaded condition, this auxiliary support does not contact the rack 20, but has an all-around radial clearance of at least 0.2 mm. Due to the circular gap, the auxiliary support is no additional permanent bearing or guide, so that the rack 20 continues to be mounted in a statically determinate fashion. In the event that a bending or deflection of the rack 20 in the region of the auxiliary support exceeds this clearance, the rack 20 will come into contact with the stop member 36, which will then largely prevent a further bending of the rack 20 and thus a possible damage to the rack-and-pinion steering 10.

In the present exemplary embodiment, the stop member 36 is a plastic ring which in terms of production engineering is simple and inexpensive to manufacture. When suitably selecting the plastic material, for example polyamide, the stop member 36 is sufficiently robust to reliably and permanently withstand the stresses occurring during operation of the rack-and-pinion steering 10.

The compression body 34 formed as a compression ring, on the other hand, is produced from an elastomer, in particular from rubber or polyurethane. Compared with the stop member 36, the compression body 34 is therefore considerably more liable to wear in regard to frictional or torsional stresses. In the case of a substantially axial stress, however, the elastic compression body 34 permanently exhibits largely constant damping characteristics.

For fixing the compression body 34 to the stop member 36, the compression body 34 may be frictionally connected and/or adhesively bonded and/or latched to the stop member 36.

In the embodiment according to FIGS. 2 to 6, the compression body 34 specifically is a rubber ring which, when mounted to the stop member 36, snaps in place in the depression 46 of the stop member 36, which is formed as a groove. For this purpose, at least one latching nose (not illustrated) may be integrally molded with an edge of the groove of the stop member 36. In this case, the damping characteristics of the end stop damping assembly 32 can be influenced by varying the cross-section and the hardness of the material of the compression body 34, for example.

In an alternative embodiment, the compression body 34 is a polyurethane ring that is rectangular in cross-section and is pressed into the groove with a frictional fit and/or is adhesively bonded with the stop member 36 in the groove. In this case, too, the damping characteristics of the end stop damping assembly 32 can be influenced by varying the cross-section and the hardness of the material of the compression body 34. Furthermore, the polyurethane ring may have recesses provided therein, which result in a "softer" damping of an end stop of the rack-and-pinion steering 10.

According to FIGS. 2 and 3, the stop member 36 in the form of a stop ring includes elastically deformable detent elements 48 and forms a detent connection with the rack housing 30. Here, the detent elements 48 are arranged uniformly distributed over the annular circumference of the ring-shaped stop member 36 on a radial outer surface thereof and protrude radially outwards.

The rack housing 30 has a cylindrical opening 50 for receiving the rack 20, the opening 50 having at least one radial recess 52 formed therein into which the detent elements 48 of the stop member 36 extend. In order to reduce production expenses, the radial recess 52 in the opening 50 more particularly is a circular groove, the groove flank 54 of which constitutes the second supporting surface 44 of the rack housing 30.

Figure 4:
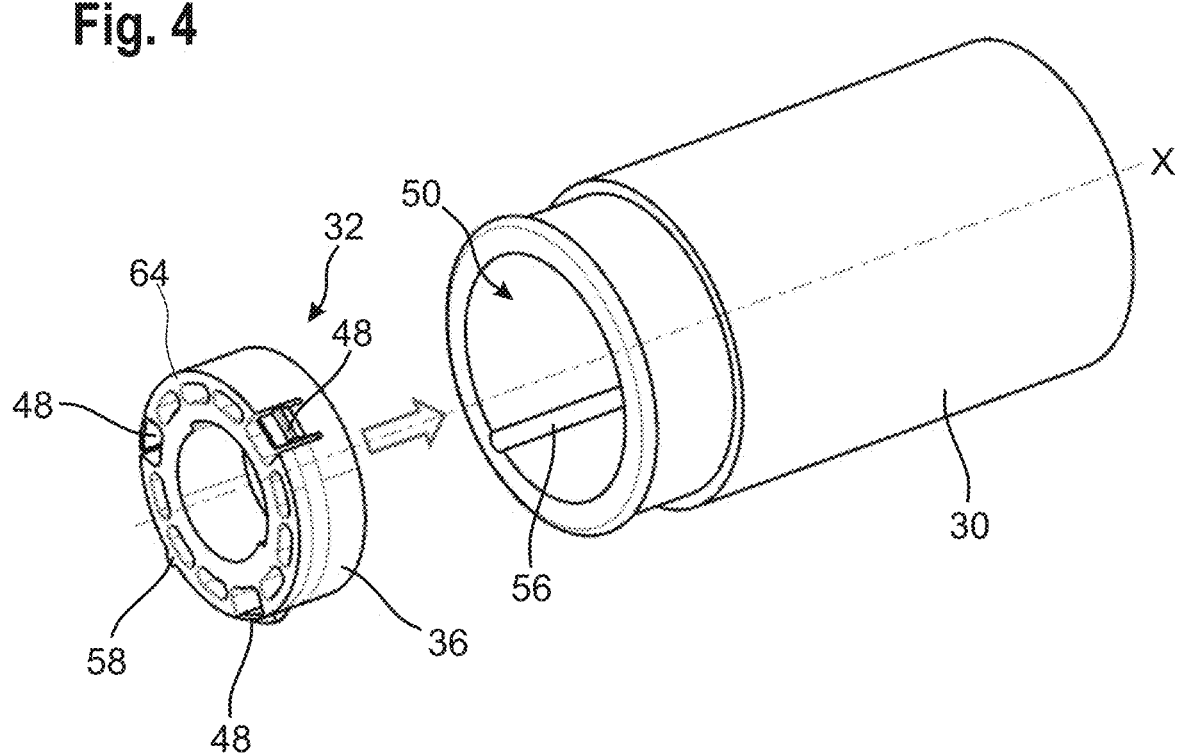
FIG. 4 shows a perspective view of the assembled end stop damping assembly according to FIG. 3 for mounting in a rack housing of the rack-and-pinion steering according to FIG. 2.

In the course of mounting the assembled end stop damping assembly 32 to the rack housing 30 according to FIG. 4, the detent elements 48 will initially deform radially inwards when the stop member 36 is inserted into the opening 50 of the rack housing 30 before they snap radially outwards and engage with the radial recess 52 upon reaching the groove-shaped recess 52, as illustrated in FIGS. 2 and 5.

FIG. 5 shows a section of a detail of the rack-and-pinion steering 10 in the area of a detent element 48 of the end stop damping assembly 32, whereas FIG. 6 illustrates a corresponding section of a detail of the rack-and-pinion steering 10 outside the detent elements 48.

With reference to FIG. 5 it becomes clear that the stop member 36 mounted to the rack housing 30 is axially pretensioned against the second supporting surface 44 by the compression body 34. This pretension prevents an axial clearance between the end stop damping assembly 32 and the rack housing 30 and ensures that the end stop damping assembly 32 takes up a strictly defined axial position in the rack housing 30 at all times.

In relation to the longitudinal axis X the stop member 36 is substantially non-rotationally fixed within the rack housing 30. In the present exemplary embodiment, this non-rotational connection between the stop member 36 and the rack housing 30 is realized in that an axial groove 56 (FIG. 4) is provided in the opening 50 of the rack housing 30 and the stop member 36 includes a rib 58 (FIG. 3) which projects radially outwards and extends in the axial direction and engages in the axial groove 56 when the end stop damping assembly 32 is mounted to the rack housing 30. As a result, when the end stop damping assembly 32 is mounted, the stop member 36 is non-rotationally guided in the axial direction in the cylindrical opening 50 of the rack housing 30. After the detent elements 48 snap into the radial recess 52, the stop member 36 is then mounted for limited displacement in the axial direction and mounted to or in the rack housing 30 so as to be substantially non-rotational.

The non-rotational fixing of the stop member 36 to the rack housing 30 ensures that a torsional moment applied by the rack 20 in the end stop of the rack-and-pinion steering 10 is introduced into the rack housing 30 by the comparatively robust stop member 36 directly, rather than by means of the compression body 34, which is liable to wear in regard to torsional stresses. The compression body 34 is, at best, loaded axially and provides for a permanent and reliable end stop damping here.

An axial displacement of the stop member 36 mounted in the rack housing 30 in relation to the rack housing 30 is limited by the first supporting surface 40 and the second supporting surface 44 of the rack housing 30, the stop member 36 resting against the first supporting surface 40 in its first axial end position (end stop of the rack-and-pinion steering 10) and against the second supporting surface 44 in its opposite, second axial end position (illustrated in FIGS. 2 and 5). The first axial supporting surface 40 and the second axial supporting surface 44 here extend substantially perpendicularly to the longitudinal axis X. In this way, it is ensured that when the end stop damping assembly 32 is acted upon axially, this will not result in any undesirable radial forces in the end stop damping assembly 32.

In the illustrated exemplary embodiment, the stop member 36 is a contact ring which, in the axial end stop of the rack-and-pinion steering 10, comes into contact on its front face with the rack 20 or with a part 60 that is firmly connected with the rack 20.

According to FIG. 2, the rack-and-pinion steering 10 is near an axial end stop position. The part 60 that is firmly connected with the rack 20 is already in contact with the stop member 36 of the end stop damping assembly 32; the compression body 34, however, has not yet experienced a compression by an axial force in the rack 20. This is apparent from the fact that, owing to the pretension of the compression body 34, the stop member 36, specifically the detent elements 48 of the stop member 36, still rest against the second supporting surface 44 of the rack housing 30.

Now when the rack 20 and the part 60 firmly connected with the rack 20, the ball joint 28 and the tie rod 24 are moved further in the axial direction towards the end stop of the rack-and-pinion steering 10 (to the left according to FIG. 2), this movement is damped by the compression body 34 until the stop member 36 has eventually compressed the compression body 34 to a maximum degree in the axial end stop position of the rack-and-pinion steering 10 and rests against the first supporting surface 40 of the rack housing 30, as shown in FIG. 7.

As soon as the rack-and-pinion steering 10 is moved toward a center position of the steerable wheels 26 again (which corresponds to the vehicle traveling straight ahead), the elastic compression body widens again and displaces the stop member 36 to the second axial end position thereof according to FIGS. 2 and 5 again, in which the stop member 36, specifically the detent elements 48 of the stop member 36, rest against the second supporting surface 44 of the rack housing 30.

In operation of the vehicle, the end stop damping assembly 32 as described ensures a reliable damping in the case of a steering lock of the rack-and-pinion steering 10. In addition, the end stop damping assembly 32 protects the rack-and-pinion steering 10, in particular the ball screw 21 and the four-point bearing of the recirculating ball nut 23, from being damaged, even in case of a so-called incorrect use of the rack-and-pinion steering 10. Such an incorrect use may occur during a wheel change, for example, when the vehicle has been jacked up and a wheel 26 or a wheel receiving portion of the steerable vehicle axle is suddenly pivoted, and the rack 20, which is axially accelerated thereby, is abruptly stopped in the mechanical end stop. The stress on the rack-and-pinion steering 10 occurring in the end stop is even intensified by the electric motor 16 since the latter is driven passively when the wheel 26 or the wheel receiving portion is pivoted, and then tends to continue to rotate due to its mass inertia. The proposed end stop damping assembly 32 in this case prevents an abrupt braking of the rack 20 in the mechanical end stop of the rack-and-pinion steering 10 and thereby protects in particular the ball screw 21 and the four-point bearing of the recirculating ball nut 23 from excessive stress and damage.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A rack-and-pinion steering for a motor vehicle, comprising
a rack having a longitudinal axis,
a rack housing in which the rack is guided for axial displacement between two end stops which are formed in the rack housing and wherein the rack housing comprises a first supporting surface and a second supporting surface, and
at least one end stop damping assembly for the rack, the end stop damping assembly being received in the rack housing,
the end stop damping assembly including a compression body for damping a movement of the rack-and-pinion steering to one of the two end stops and a stop member, the stop member being mounted to the rack housing for limited displacement in a first axial direction and/or a second axial direction in relation to the rack housing, and
the stop member resting against the first supporting surface of the rack housing at least partly by means of the compression body in a first axial end position,
wherein the stop member rests against the second supporting surface of the rack housing in an opposite, second axial end position,
wherein the compression body is received in an axial depression in the front face of the stop member and projects axially beyond the stop member.

2. The rack-and-pinion steering according to claim 1, wherein the stop member is a contact ring which, in an axial end stop position of the rack-and-pinion steering, comes into contact on a front face thereof with the rack.

3. The rack-and-pinion steering according to claim 1, wherein the stop member includes detent elements and produces a detent connection with the rack housing.

4. The rack-and-pinion steering according to claim 3, wherein the rack housing has a cylindrical opening for receiving the rack, the opening having at least one radial recess formed therein into which the decent elements of the stop member extend.

5. The rack-and-pinion steering according to claim 4, wherein the radial recess in the opening of the rack housing is formed as a circular groove, and a groove flank of the groove constitutes the second supporting surface.

6. The rack-and-pinion steering according to claim 1, wherein an axial displacement of the stop member in the mounted condition is limited by the first supporting surface or the second supporting surface of the rack housing.

7. The rack-and-pinion steering according to claim 1, wherein at least one of the first supporting surface and the second supporting surface extends substantially perpendicularly to the longitudinal axis.

8. The rack-and-pinion steering according to claim 1, wherein the stop member in the mounted condition is axially pretensioned against the second supporting surface by the compression body.

9. The rack-and-pinion steering according to claim 1, wherein the stop member is configured as an auxiliary support and limits a bending of the rack.

10. The rack-and-pinion steering according to claim 1, wherein the stop member is fixed within the rack housing substantially non-rotationally in relation to the longitudinal axis.

11. The rack-and-pinion steering according to claim 1, wherein the stop member is a plastic ring.

12. The rack-and-pinion steering according to claim 1, wherein the compression body and the stop member are formed to be ring-shaped and are arranged concentrically with the longitudinal axis.

13. The rack-and-pinion steering according to claim 12, wherein an inside diameter of the ring-shaped stop member is smaller than an inside diameter of the ring-shaped compression body.

14. The rack-and-pinion steering according to claim 1, wherein the compression body is made from an elastomer.

15. The rack-and-pinion steering according to claim 1, wherein the compression body is connected with the stop member by at least one of a frictional connection, an adhesive bond and a detent connection.

* * * * *